United States Patent Office 2,731,354
Patented Jan. 17, 1956

2,731,354
COATING MATERIAL RESISTANT TO DETERIORATION AND CHALKING

Ralph J. Wirshing, Detroit, Mich., assignor to General Motors Corporation, Detroit, Mich., a corporation of Delaware No Drawing. Application September 29, 1951, Serial No. 249,003

3 Claims. (Cl. 106—14)

This invention relates to coating compositions. More particularly, this invention relates to improved coating compositions such as lacquers, enamels, varnishes and paints having a particularly high resistance to chalking and deterioration.

Coating materials such as the ordinary lacquers, enamels and the like, usually consist of a pigment material suspended in some suitable vehicle as, for example, a cellulose derivative, or various synthetic, or naturally occurring resins and oils, together with diluents, thinners and perhaps driers. One of the major difficulties encountered with such pigment containing coating materials is their tendency to chalk, especially when subjected to moisture and sunlight. By chalk is meant the formation of a white or light colored powder material on the surface of the coating which can be removed by wiping or polishing. This chalk formation is very undesirable since it causes loss of luster and an unsightly appearance. Repeated polishing to keep the coating free of chalk and thereby maintain a pleasing appearance eventually results in a removal of the film, or at least a removal of such large portions of the film as to cause exposure of the undercoat or base material.

It is an object of this invention to provide coating materials that have a very high resistance to deterioration. Another object of this invention is to provide a pigment containing coating material that is highly resistant to chalking. Still another object of this invention is to provide a method whereby coating materials such as varnishes, enamels, paints and lacquers can be given increased resistance to deterioration or chalking.

Many theories have been proposed which attempt to explain the chalking of enamels, lacquers and the like in terms of the chemical reactions which occur. Perhaps the most common of these theories is that the chalking is caused by an oxidation of the vehicle which occurs most readily under the influence of sunlight and moisture and which deteriorates the outermost surface of the coating so as to expose the pigment material in the form of powder or chalk. In accordance with this theory it has been proposed to add suitable reducing agents to the coating material so as to inhibit the theorized oxidation reactions. However, it has been found that the addition of reducing agents has little or no effect in preventing the chalking of the coating.

Whatever may be the theory involved, I have discovered that contrary to what might be expected in light of the oxidation theory, the addition of strong oxidizing agents materially inhibits the formation of chalk. In accordance with my invention, paints, enamels, varnishes and lacqeurs are formulated to contain a portion of some suitable, strong oxidizing agent. Particularly suitable as anti-chalking additives are the water soluble permanganates and dichromates such as potassium permanganate and potassium or sodium dichromate.

The strong oxidizing agents such as the alkali metal dichromates and permanganates are effective in preventing chalking irrespective of the type of vehicle or pigment used. They can be used with good effect in lacquers having metallic powder type pigments or the heavy metal chromate type pigments as well as in those containing zinc oxide and titanium oxide or mixtures of the oxides and chromates. Since, however, those lacquers or paints which utilize the oxide type pigments such as zinc oxide or titanium oxide have notoriously bad chalking characteristics, my anti-chalking additives are particularly useful in conjunction with these types of coating materials.

The oxidizing agents impart greatly increased chalk resistance to coating materials using a titanium oxide pigment irrespective of whether the anatase type or the rutile type is utilized. I wish to point out, however, that since rutile titanium dioxide inherently has better anti-chalking characteristics than the anatase, coating materials formulated from rutile titanium oxide and the anti-chalking additives of this invention have superior anti-chalking properties to those utilizing anatase titanium dioxide.

Very often the major pigment material such as titanium oxide or zinc oxide is tinted with minor amounts of highly colored materials such as lampblack, organo metallics, iron compounds and the like. The oxidizing agent additives of this invention serve equally well with these tinted type pigments to prevent chalking and deterioration.

The strong oxidizing agent additives also work well with all of the commonly used vehicles such as the plasticized and unplasticized synthetic and natural resins, the oil modified synthetics and the cellulose derivative types which are comonly used in the lacquers.

If the coating is of such a type as requires a solvent or diluent, then any of the commonly used solvents or diluents may be used. Typical examples are the esters such as ethyl acetate, the alcohols such as butyl alcohol, ethers such as the Cellosolves, and ketones such as methyl ethyl ketone.

The strong oxidizing agent additive is added to the coating material in an undiluted or concentrated form. In the case of the alkali metal dichromates and permanganates, addition is made in the solid form. We have found that concentrations of the strong oxidizing agents of from .25% to 10% by weight are effective in inhibiting chalking and deterioration.

The following examples of coating compositions containing strong oxidizing agents as additives will serve to illustrate specific embodiments of my invention.

*Example I*

| Component: | Percent by weight |
|---|---|
| China-wood oil | 9 |
| Linseed oil | 27 |
| Glyptal resin | 36 |
| Urea formaldehyde resin | 1 |
| Titanium oxide | 25.5 |
| Phthalo cyanine blue | .5 |
| Potassium permanganate | 1 |
| | 100 |

*Example II*

| Component: | Percent by weight |
|---|---|
| Nitrocellulose | 10 |
| Damar resin | 3 |
| Ester gum | 2 |
| Castor oil | 3 |
| Dibutyl phthalate | 3 |
| Zinc oxide | 16 |
| Sodium dichromate | 5 |
| Solvents and diluents | 58 |
| | 100 |

Example III

| Component: | Percent by weight |
|---|---|
| Nitrocellulose | 15 |
| Damar resin | 4 |
| Dibutyl phthalate | 5 |
| Castor oil | 4 |
| Titanium dioxide | 7 |
| Potassium dichromate | 8 |
| Solvents and diluents | 57 |
| | 100 |

Example IV

| Component: | Percent by weight |
|---|---|
| Linseed oil modified alkyl resin | 5 |
| China-wood oil, linseed oil modified alkyd resin | 50 |
| Melamine resin | 5 |
| China-wood oil modified phenol formaldehyde resin | 10 |
| Manganese drier | .25 |
| Potassium dichromate | 5 |
| Solvents and diluents | 24.75 |
| | 100 |

The coating materials are mixed by usual milling processes well known in the art.

The oxidizing agent additive may conveniently be added in a solid form by grinding it into a finely divided powder prior to milling it into the enamel, lacquer or varnish. Addition may be made at any stage in the process. Thus, sodium or potassium dichromate or permanganate may be mixed with the pigment and then milled with the pigment into the vehicle, or the oxidizing agent may, for example, be added to the coating material after vehicle and pigment milling and even after the addition of thinners and diluents. In this regard the anti-chalking properties and the durability of lacquers, enamels, etc., purchased on the market may be greatly enhanced by milling into the coating material the strong oxidizing agent additives of this invention. As stated previously, additions of the strong oxidizing agents of from .25% to 10% by weight, based on the weight of the coating material (including the weights of solvents and diluents, if such are used) are effective. We have found, however, that in the case of most of the ordinary enamels and lacquers, a concentration of about 5% by weight of the strong oxidizing agent is most satisfactory.

Panels coated with the above compositions and with similar coating materials utilizing strong oxidizing agents or anti-chalk additives were subjected to outdoor exposure tests conducted in Miami, Florida, where conditions of humidity and sunlight are most severe. After months of continuous exposure, the panels were compared with control panels which were exposed for a like period of time under the same conditions and which were coated with compositions identical to the above save for the absence of the oxidizing agent anti-chalk additives. The control panels were heavily chalked, whereas the panels coated with the improved compositions containing the strong oxidizing agent additives were practically free from chalk.

It is the thought that the strong oxidizing agent additive serves to prevent the deterioration and decomposition of the coating vehicle. In this regard it has been found that the durability of unpigmented coating materials is highly increased by the addition of strong oxidizing agents such as potassium permanganate, potassium dichromate or sodium dichromate. One theory which has been proposed to explain the remarkable chalk and deterioration inhibiting qualities of our additives is that the strong oxidizing agents prevent or inhibit the formation of peroxide type linkages which have been found to have formed in uninhibited coating materials when exposed to light and moisture. Whatever may be the theory involved, we have found that coating materials containing strong oxidizing agents such as the water soluble permanganates and dichromates, have great resistance to chalking and deterioration and thereby retain their gloss and durability even after long and continuous periods of exposure to the most severe light and humidity conditions.

It will be apaprent that the improved coating compositions resulting from this invention are particularly useful as automobile finishes since such finishes, because of the severe conditions of sunlight and moisture to which they are subjected, are especially subject to chalking and general deterioration. The coating materials also are quite useful as finishes for furniture, toys and other such articles, the finishes of which are subjected to the deteriorating effects of sunlight and humidity.

It will be apparent that many changes can be made in the proportions and types of the various coating material ingredients without departing from the spirit and scope of the invention. Thus, while the invention has been discussed above in conjunction with certain specific embodiments, it is to be understood that the invention is not to be limited thereby except as defined in the appended claims.

I claim:

1. A protective and decorative coating material for use as an exterior gloss finish on automobiles and similar articles which are exposed to moisture and sunlight during normal usage, said coating material consisting predominantly of an organic vehicle selected from the group consisting of the natural and synthetic resins, the drying oil modified synthetic resins, the drying oils, and mixtures thereof, a pigment material selected from the group consisting of titanium oxide, zinc oxide and mixtures thereof, from about .25% to 10% by weight of an oxidizing agent to inhibit corrosion and chalking from light and moisture, and sufficient organic solvent to render said coating material fluid for application to the surface to be coated, said oxidizing agent being selected from the group consisting of the alkali metal dichromates and the alkali metal permanganates.

2. A protective and decorative coating material for use as an exterior gloss finish on automobiles and similar articles which are exposed to moisture and sunlight during normal usage, said coating material consisting predominantly of an organic vehicle selected from the group consisting of the natural and synthetic resins, the drying oil modified synthetic resins, the drying oils, and mixtures thereof, a pigment material selected from the group consisting of titanium oxide, zinc oxide and mixtures thereof, from about .25% to 10% by wieght of an alkali metal dichromate to inhibit corrosion and chalking from light and moisture, and sufficient organic solvent to render said coating material fluid for application to the surface to be coated.

3. A protective and decorative coating material for use as an exterior gloss finish on automobiles and similar articles which are exposed to moisture and sunlight during normal usage, said coating material consisting predominantly of an organic vehicle selected from the group consisting of the natural and synthetic resins, the drying oil modified synthetic resins, the drying oils, and mixtures thereof, a pigment material selected from the group consisting of titanium oxide, zinc oxide and mixtures thereof, from about .25% to 10% by weight of an alkali metal permanganate to inhibit corrosion and chalking from light and moisture, and sufficient organic solvent to render said coating material fluid for application to the surface to be coated.

References Cited in the file of this patent

UNITED STATES PATENTS

| 1,147,971 | Perry | July 27, 1915 |
| 2,069,660 | Saunders | Feb. 2, 1937 |
| 2,237,745 | Musgrove | Apr. 8, 1941 |
| 2,523,626 | Jones et al. | Sept. 26, 1950 |
| 2,544,391 | Marling | Mar. 6, 1951 |